United States Patent [19]
Fujinawa et al.

[11] Patent Number: 5,859,734
[45] Date of Patent: Jan. 12, 1999

[54] LIGHT-SUPPLYING OPTICAL DEVICE

[75] Inventors: Nobuhiro Fujinawa, Kanagawa-ken; Eisaku Maeda, Chiba-ken, both of Japan

[73] Assignee: Nikon Corporation, Tokyo, Japan

[21] Appl. No.: 371,438

[22] Filed: Jan. 11, 1995

[30] Foreign Application Priority Data

Jan. 20, 1994 [JP] Japan .................................. 6-004533

[51] Int. Cl.$^6$ .............................. G02B 5/08; G02B 27/14
[52] U.S. Cl. ...................... 359/839; 359/857; 359/869; 359/634; 362/301; 362/302; 355/67
[58] Field of Search .................... 359/839, 857, 359/858, 859, 861, 868, 634; 362/296, 297, 298, 301, 302, 347, 350; 355/67

[56] References Cited

U.S. PATENT DOCUMENTS

| | | | |
|---|---|---|---|
| 3,447,854 | 6/1969 | Minter | 359/471 |
| 3,827,778 | 8/1974 | Wheeler | 359/858 |
| 4,639,082 | 1/1987 | Loy | 359/861 |
| 4,718,754 | 1/1988 | McIntosh | 359/857 |
| 4,893,920 | 1/1990 | Webb | 351/205 |
| 5,090,798 | 2/1992 | Kohayakawa . | |
| 5,191,406 | 3/1993 | Brandestini et al. . | |
| 5,214,536 | 5/1993 | Prakash . | |
| 5,255,116 | 10/1993 | Araki et al. . | |
| 5,285,320 | 2/1994 | Hohberg . | |
| 5,408,346 | 4/1995 | Trissel et al. | 359/631 |
| 5,668,656 | 9/1997 | Fujinawa et al. | 362/296 |

*Primary Examiner*—Ricky D. Shafer
*Attorney, Agent, or Firm*—Oliff & Berridge, PLC

[57] ABSTRACT

In order to suppress generation of the line bow phenomenon created when light from a light source is collected into a linear form on the surface of an original document by a toric mirror, for example, and in order to obtain uniform lighting, the optical axis of the light source is made to be in a common plane with a line normal to the surface of the toric mirror. Accordingly, the light travelling to the toric mirror, between the light source and the toric mirror, and the light reflected by the toric mirror, travelling between the toric mirror and the second mirror, is not inclined relative to the toric mirror normal line. The second mirror, the optical path conversion mirror, can be a half-mirror positioned between the light source and the toric mirror. Alternatively, a separate light source can be provided on opposite sides of the second mirror. As another alternative, the second mirror can be divided into two portions, with the light source being provided between the two portions.

8 Claims, 7 Drawing Sheets

FIG. 11A PRIOR ART

LIGHT-SUPPLYING OPTICAL DEVICE

BACKGROUND OF THE INVENTION

1. Field of the Invention

The present invention relates to a light-supplying optical device used in an image reading system that electrically reads image information of an original document, and, in particular it relates to a light-supplying optical device capable of suppressing the line bow phenomenon produced by a mirror, such as for example, a toric mirror that collects light from the light source into a linear form.

2. Description of Related Art

Figure 7:
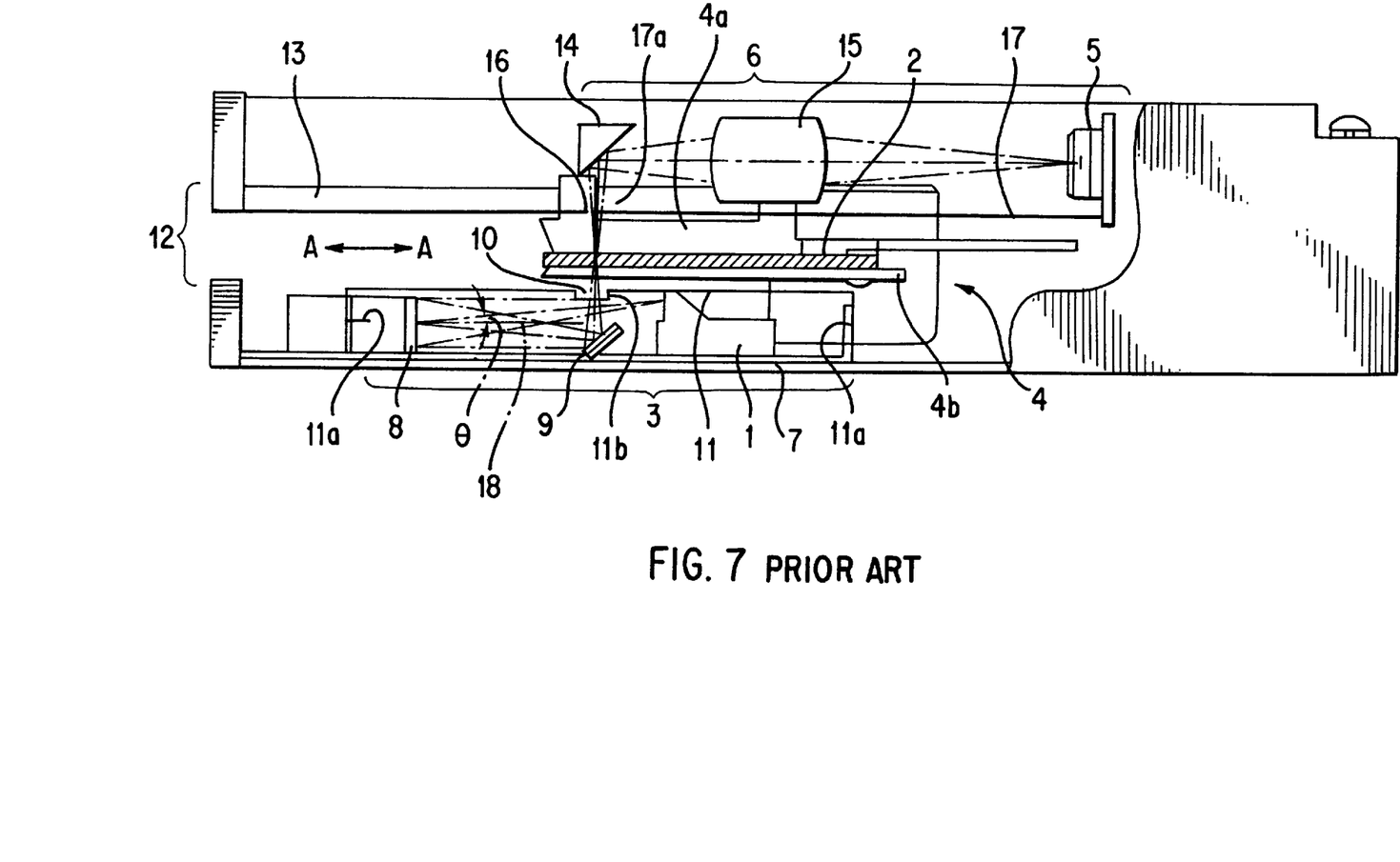
FIG. 7 is a partial side cross-sectional view of one example of an image reading system having a conventional light-supplying optical device.
Figure 8:
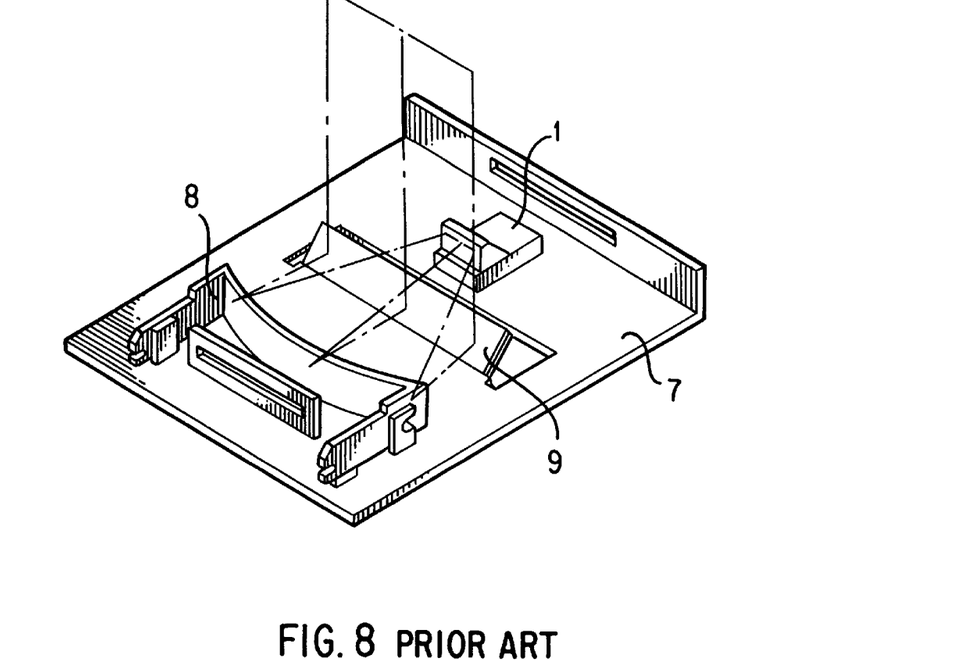
FIG. 8 is an oblique view of the light-supplying optical device of FIG. 7.

FIGS. 7 through 10 show the structure of one type of conventional image reading system. Referring to FIGS. 7 and 8, the image reading system includes an illuminating unit 3 that conducts light supplied from a light source 1 to the surface of an original document 2. The image reading system also includes a carriage 4 that supports and moves the original document 2, and a projection unit 6 that forms the light that passes through the original document 2 into an image on a linear sensor 5 (e.g., a CCD:Charge-Coupled-Device).

The illuminating unit 3 includes a plate-like base member 7 on top of which are attached a light source 1 that emits light radially, a first mirror 8 and a second mirror 9 that change the direction of the light so that it is formed into a line on the surface of the original document 2. An illuminating unit lid 11 containing a slit 10 through which light can pass is fixed to the base member 7 by means of a hook-shaped fastener 11a so as to cover the light source 1, the first mirror 8 and the second mirror 9. Light from the light source 1 is collected by the first mirror 8 so as to form a line on the surface of the original document, and is bent (i.e., reflected) in the direction of the original document, i.e. in the vertical direction, by the second mirror 9.

Accordingly, light from the second mirror 9 is formed into the shape of a long, thin rectangle (i.e., an area of light extending in a primary scan direction) close to where it passes through the slit 10 in the lid 11. Because the slit 10 provided in the lid 11 should be the size needed for the passage of light, it is in the shape of a rectangle, slightly larger than the rectangular shape of the light. In addition, a plate 11b is bent inward on part of the slit 10 so as to prevent external light from the opening 12 provided in the front of the base member 7 from reaching the light source 1 by passing through the slit 10.

The upper carriage portion 4a and lower carriage portion 4b that support the original document 2 are guided by two parallel guide bars 13 so as to be capable of moving to the left and right as shown by arrow A—A (in what is known as the secondary scan direction). A rack unit, not shown in the drawing, is provided on part of the upper carriage 4a, and is engaged with a pinion gear. The carriage 4 moves back and forth by means of the pinion gear engaging with the carriage rack, the pinion gear being driven by a stepping motor or similar means.

The projection unit 6 includes a third mirror 14, a lens 15, a CCD 5 and a projection unit lid 17 that covers the entire unit and is provided with a slit 16 that allows light passing through the original document to enter the projection unit 6. In addition, a plate 17a is bent inward from the slit 16 in the projection unit lid 17 as was the case with the illuminating unit lid 11, the plate 17a preventing external light from the opening 12 from entering the projection unit 6 through the slit 16. The illuminating unit lid 11 and the projection unit lid 17 both have surfaces that are black and have been deglossed so that the lids themselves do not reflect external light.

Figure 9:
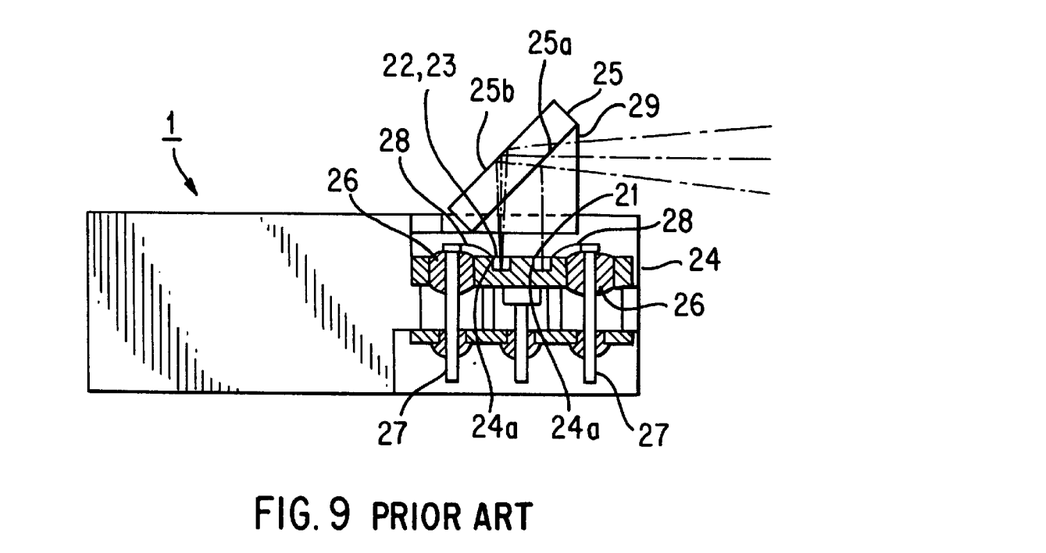
FIG. 9 is a vertical cross-sectional view showing the structure of the light source of FIG. 8.
Figure 10:
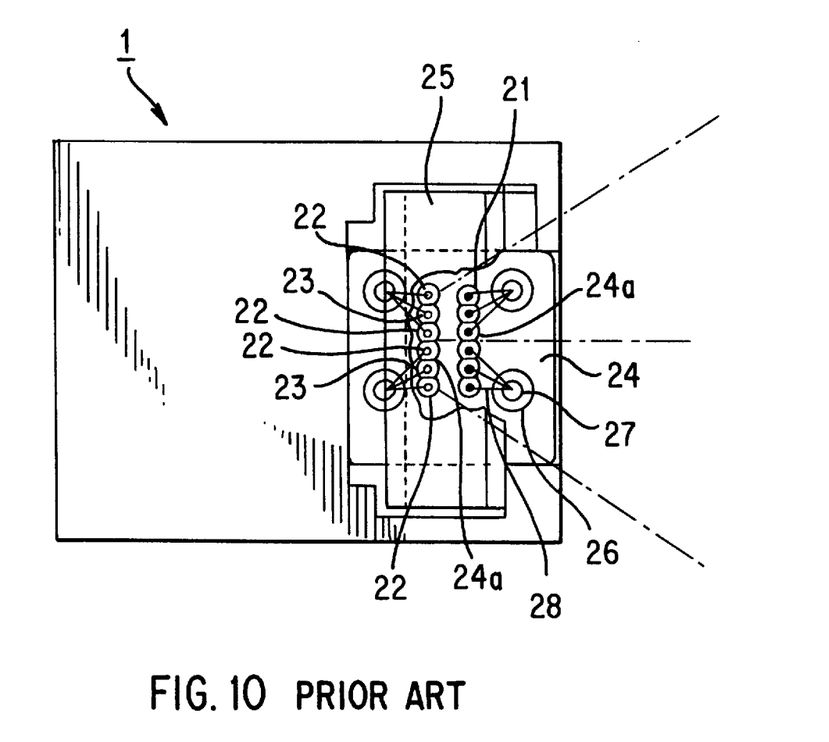
FIG. 10 is a partial cross-sectional plan view of the FIG. 9 light source.

FIGS. 9 and 10 show the composition of the light source of such a conventional device. The light source 1 has six blue LEDs 21, which function as a first light producing means, and four green LEDs 22 and two red LEDs 23, which function as a second light producing means, each of the LEDs 21, 22 and 23 being mounted on a stem 24. The blue LEDs 21 are arranged in a single straight line, and the green LEDs 22 and red LEDs 23 are arranged in a parallel straight line. The optical axis of light produced by the LEDs 21, 22 and 23 and reflected by the surface of a mirror 25 provided in the light source 1 as a reflecting optical system is positioned so as to fall in a single plane.

The 12 LEDs 21, 22 and 23 are mounted on a stem 24 formed of electrically conductive materials in a plate shape, one electrode of each LED 21, 22 and 23 being connected to the stem 24. The other electrode of each of the LEDs 21, 22 and 23 is connected via a wire 28 to an electrode 27 mounted on the stem 24 by means of an insulating material 26. A conical reflector 24a that reflects light produced in the sideways direction and directs it upward is formed in the stem 24 around each of the LEDs 21, 22 and 23. Light reflected by each of the reflectors 24a is reflected by the reflecting mirror 25 and directed toward the front (the right in FIGS. 9 and 10), and is further collected in a linear form on the surface of the original document 2 by mirrors 8 and 9.

The light produced by the blue LEDs 21 is reflected by a blue reflecting film 25a formed on a first surface of the reflecting mirror 25, while light from the green LEDs 22 and red LEDs 23 is reflected by a wholly reflecting film 25b, formed on a second surface of the reflecting mirror 25. As a result, when viewed from the front, it appears that all three colors of light are emitted from the same position. In addition, switching between the three colors blue, green and red is controlled electrically, making it possible to read the original document 2 at high speed. A 45° prism 29 also is provided on the light-emitting surface of the reflecting mirror 25.

A toric mirror is used as the first mirror 8. The toric mirror 8 is comprised of a curved surface having curvature in both the lengthwise direction (i.e., the horizontal direction as shown in FIG. 8) and in a direction perpendicular to the lengthwise direction (i.e., the vertical direction as shown in FIG. 7). The arrangement is such that light produced by the light source 1 illuminates a width of one line on the document by means of the curved surface in the lengthwise direction. That is, the curvature R1 in the lengthwise direction causes the rectangle of light reflected by toric mirror 8 to have a certain length. The light image provided by light source 1 is formed into a linear image onto the surface of the original document by means of the curved surface in the direction perpendicular to the lengthwise direction. That is, the curvature R2 in the direction perpendicular to the lengthwise direction causes the rectangle of light reflected by toric mirror 8 to have a certain width, which usually is much less than the length.

Light emitted from the light source 1 is incident on the toric mirror 8 at an angle Θ relative to a line 18 normal to a central portion of the mirror 8. Accordingly, the light reflected by the toric mirror 8 is reflected at the angle Θ relative to the line 18. Such light is formed into an image on the surface of the original document 2 by means of the second mirror 9, which also is referred to as an optical path conversion mirror. By moving the carriage 4 that holds the original document 2 in the secondary scan direction indicated by arrows A—A, the CCD 5 successively reads image information from the entire surface of the original document (one line at a time).

Figure 11A:
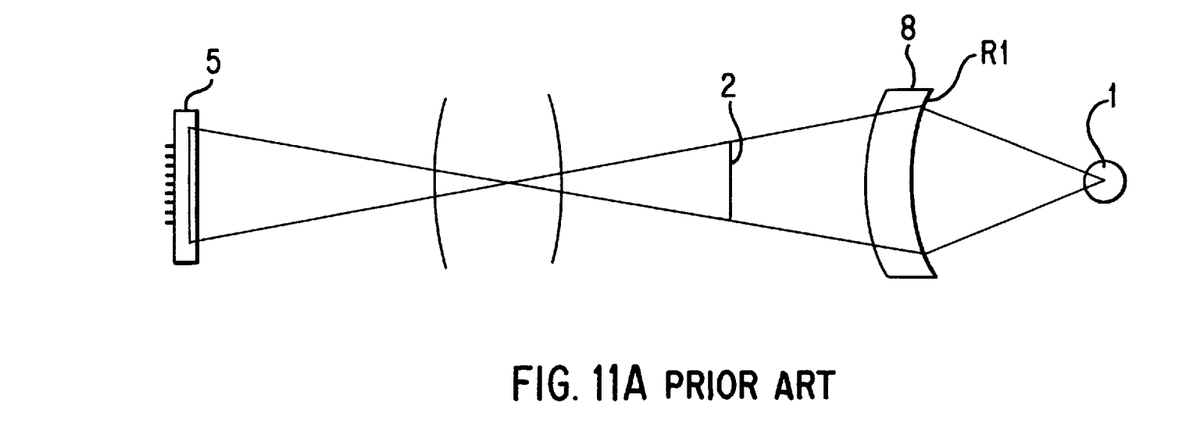
FIGS. 11A and 11B are top and side views, respectively, of the unfolded light-supplying optical path.
Figure 11B:
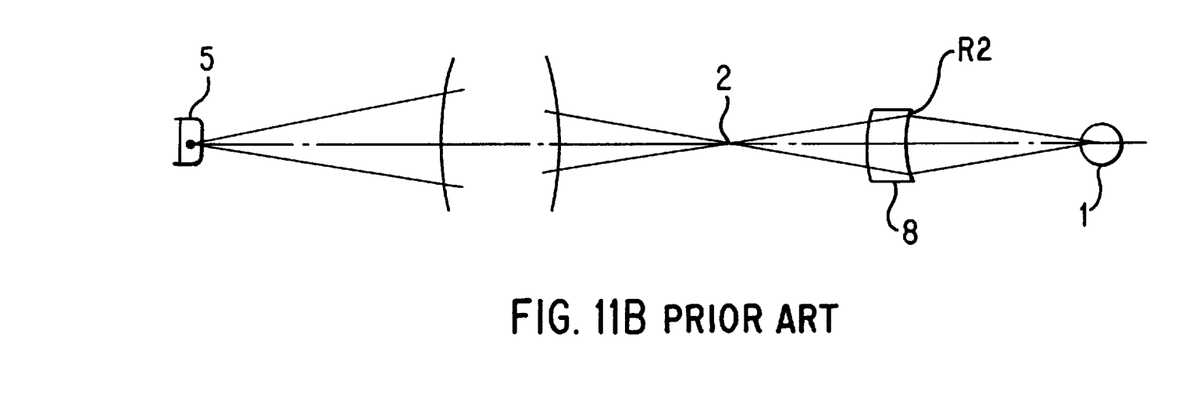
Figure 11C:
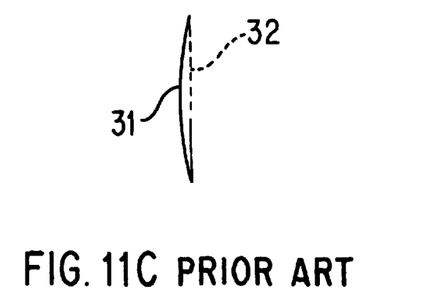
FIG. 11C illustrates the manner in which the line bow phenomenon occurs.
Figure 11D:
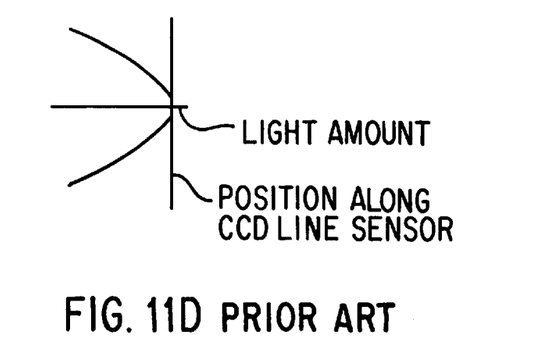
FIG. 11D is a graph showing the CCD input when subjected to the line bow phenomenon.

However, with the described conventional image reading system, light emitted from the light source 1 is incident at the angle Θ from the line 18 normal to the toric mirror, while the toric mirror has curvatures R1 and R2 in the perpendicular directions as shown in FIGS. 11A and 11B, which are top and side views, respectively, of the light-supplying optical system in an unfolded state. Consequently, the angle of light reflection varies between the ends and the center of the toric mirror 8. As a result, the light source image 31 formed on the surface of the original document 2 is bow-shaped, as shown in FIG. 11C, thus creating the so-called line bow phenomenon. On the other hand, because the reading line 32 of the CCD 5 on the surface of the original document is a straight line, a problem arises in that lighting cannot be obtained that is uniform at both the center and at the ends of the reading line 32, as indicated in FIG. 11D, which is a graph showing the amount of light received by the CCD 5 relative to positions along the CCD 5.

SUMMARY OF THE INVENTION

It is an object of the present invention to eliminate the described difficulties in conventional devices and to provide a light-supplying optical device that can suppress generation of the line bow phenomenon so as to provide uniform lighting.

In accordance with this and other objects of the present invention, embodiments of the present invention provide an arrangement in which the optical axis of light travelling on a first path between a light source and a first mirror (which also contains the optical axis of the light source) and the optical axis of a linear area of light reflected by the first mirror and travelling on a second path between the first mirror (e.g., a toric mirror) and an optical path conversion mirror are in a common plane. Accordingly, the optical axes of the light source and of the linear area of light also are in the common plane. The optical path conversion mirror reflects light toward an original document after the light generated by the light source has been reflected by the first (toric) mirror. For example, the light-supplying optical device would include the light source, a toric mirror that forms light emitted from the light source into a linear image, and the optical path conversion mirror positioned in the light path between the original document and the toric mirror.

According to one embodiment, the optical path conversion mirror is a half-mirror. The half-mirror is positioned in the first path between the light source and the toric mirror. Light emitted from the light source passes through the half-mirror, is reflected by the toric mirror, and then is reflected by the half-mirror to the original document.

According to another embodiment, the light source comprises two light-supplying units that are positioned adjacent to the two opposite ends of the optical path conversion mirror.

According to another embodiment of the invention, the optical path conversion mirror is divided into two portions in a direction perpendicular to its lengthwise direction. The light source is positioned between the two portions of the optical path conversion mirror. With this embodiment, a light-shielding plate can be provided at least on the light-emitting surface of the light source in order to prevent random reflection by the light source of light reflected from the toric mirror.

In all embodiments, preferably the optical axis of the light source (and of the first path) is co-planar with a line normal to a central portion of the toric mirror, and the optical axis of the second path (between the toric mirror and the optical path conversion mirror) also is co-planar with the line normal to the central portion of the toric mirror. Accordingly, the optical axes of linear area of light emitted by the light source and of the linear area of light reflected by the first mirror are coplanar.

In a light-supplying optical device having the structure described above, the optical axis of light from the light source incident on the toric mirror and the optical axis of light reflected from the toric mirror to the optical path conversion mirror lie in the same plane. Therefore, it is not necessary to reflect light at an angle relative to the normal line of the toric mirror. Accordingly, it is possible to suppress generation of the line bow phenomenon on the surface of the original document. As a result, essentially uniform lighting can be performed on the region of the original document read by the CCD, and unevenness in light illumination does not increase.

BRIEF DESCRIPTION OF THE DRAWINGS

The invention will be described in conjunction with the following drawings in which like reference numerals designate like elements and wherein:

FIGS. 11A–D are explanatory drawings showing the optical arrangement of the conventional light-supplying optical system of FIG. 7 and the line-bow phenomenon that occurs therewith; in particular.

DETAILED DESCRIPTION OF PREFERRED EMBODIMENTS

Preferred embodiments of light-supplying optical devices in accordance with the present invention will be described hereafter with reference to the accompanying drawings.

FIGS. 1–6 show the structure of first, second and third embodiments of light-supplying optical devices in accordance with the present invention. In these figures, elements that correspond to elements in the conventional image reading system shown in FIGS. 7 and 8 are identified with symbols identical to those used in FIGS. 7 and 8. Hence, further explanation of these elements has been omitted.

Figure 1:
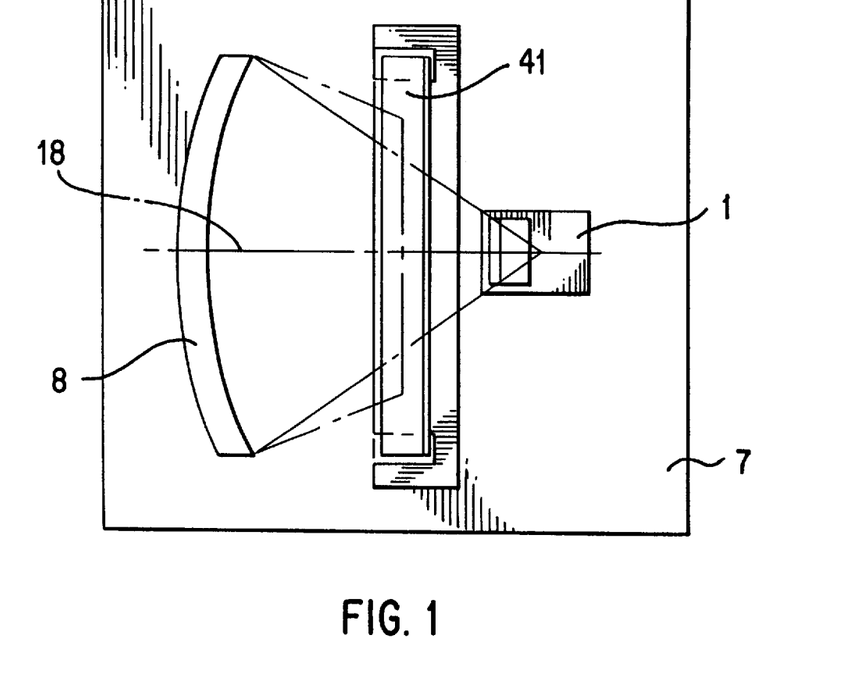
FIG. 1 is a plan view of a first embodiment of a light-supplying optical device according to the present invention.
Figure 2:
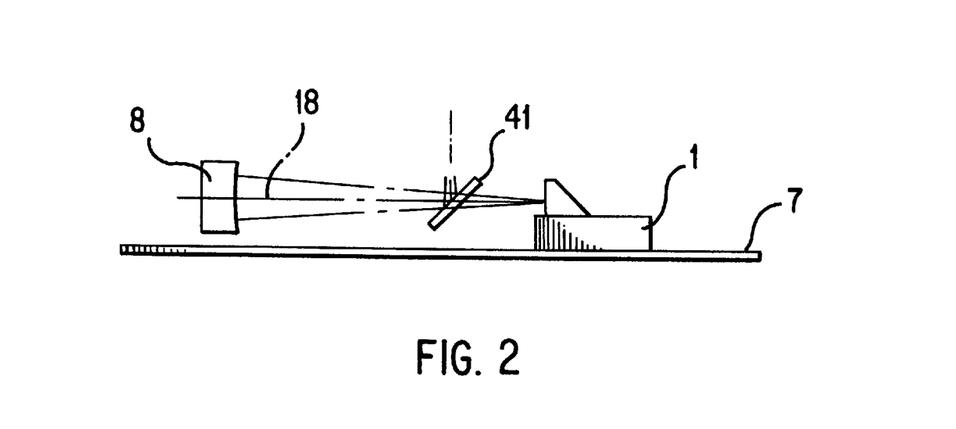
FIG. 2 is a side view of FIG. 1.

FIG. 1 and 2 show structure of a first embodiment according to the present invention. In this first embodiment, the second mirror (the optical path conversion mirror) shown in FIG. 8 comprises a half-mirror 41. The optical axis of light emitted by the light source 1 (i.e., light travelling in a first plane on a first path between the light source 1 and the toric mirror 8) and the optical axis of the reflected area of light travelling in the first plane on a second path between the toric mirror 8 and the half-mirror 41 are in a single plane (i.e., the first plane) that also includes a line 18 normal to a central portion of the toric mirror 8. (Line 18 also can be referred to as the optical axis of the central portion of the toric mirror 8 and is also the optical axis of the light emitted from light source 1.) As a result, light produced by the light source 1 is conducted along line 18 to the toric mirror 8 after passing through the half-mirror 41, and is reflected (by toric mirror 8) along the same optical axis without forming an angle from the normal line 18. The reflected light is reflected by the half-mirror 41, the light being changed to travel in the vertical direction. In this manner, the light is conducted to the original document 2.

With the first embodiment, because it is not necessary to incline the line 18, which is normal to the toric mirror 8, relative to the optical axis of the light source 1, generation of the line bow phenomenon on the surface of the original document 2 can be suppressed and substantially linear lighting can be accomplished. The optical axis of the light travelling between light source 1 and toric mirror 8 is not at an angle to normal line 18. Similarly the optical axis of the light travelling between toric mirror 8 and half-mirror 41 is not at an angle to normal line 18. Consequently, because nearly uniform lighting can be accomplished in the region read by the CCD 5, the creation of uneven light illumination can be prevented.

Figure 3:
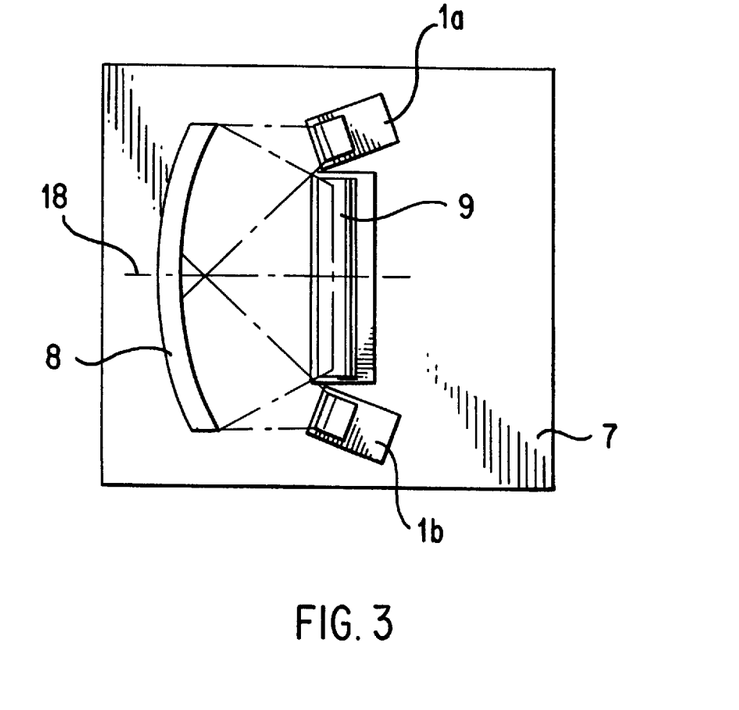
FIG. 3 is a plan view of a second embodiment of a light-supplying optical device according to the present invention.
Figure 4:
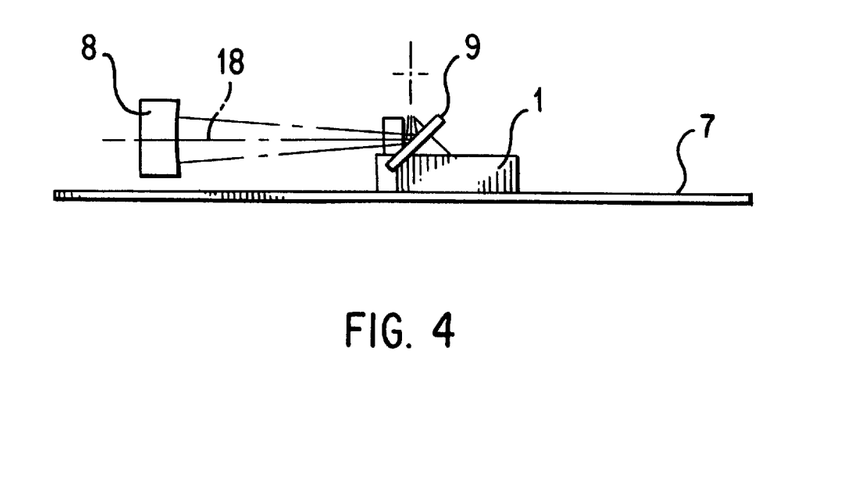
FIG. 4 is a side view of FIG. 3.

FIGS. 3 and 4 show structure of a second embodiment of the present invention. With the second embodiment, the light source is comprised of two units 1a and 1b, these two units being placed adjacent to opposite ends of the second mirror 9 in the lengthwise direction of the second mirror 9. The optical axes of the linear area of light emitted from the pair of light sources 1a and 1b incident on the toric mirror 8, and the optical axis of the linear area of light reflected from the toric mirror 8 toward the second mirror 9, are in the same plane that contains the normal line 18 of the toric mirror 8, as illustrated in FIG. 4. Thus, as in the first embodiment, with respect to the vertical direction (the direction perpendicular to the length of the toric mirror 8), there is no angle between the optical axes of light sources 1a and 1b and the normal line 18. Accordingly, there also is no angle between the optical axis of the light reflected by toric mirror 8 and the normal line 18. In addition, as shown in FIG. 3, the area where light from the pair of light sources 1a and 1b overlaps on the toric mirror 8 is made to be as small as possible, so as to minimize the creation of unevenness in light illumination. Additionally, as shown in FIG. 4, the optical axes of the emitted and reflected linear areas of light are in the same plane.

With the second embodiment, the same results can be achieved as were realized with the first embodiment.

Figure 5:
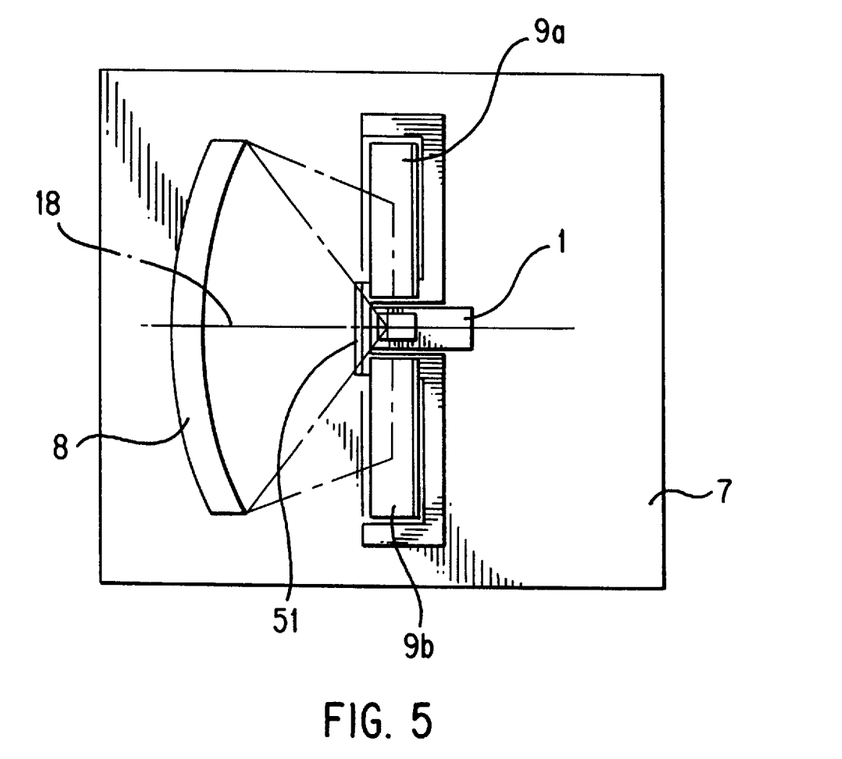
FIG. 5 is a plan view of a third embodiment of a light-supplying optical device according to the present invention.
Figure 6:
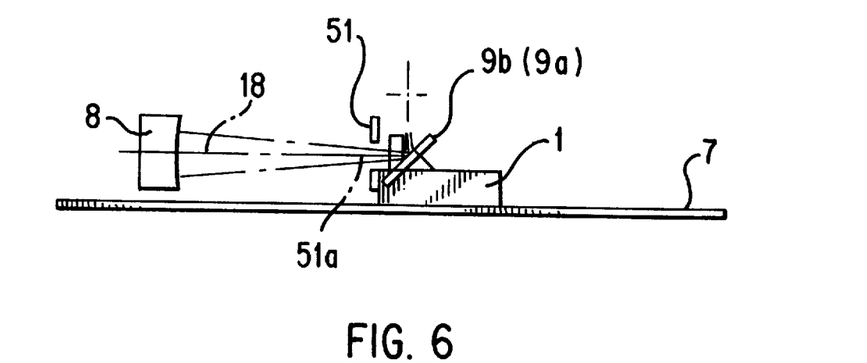
FIG. 6 is a side view of FIG. 5.

FIGS. 5 and 6 show the structure of a third embodiment of the present invention. In this third embodiment, the second mirror is divided into two portions down the center of its longer side, and the light source 1 is positioned between this divided pair of second mirrors 9a and 9b. In this embodiment also, the optical axis of the light emitted from the light source 1 incident on the toric mirror 8, and the optical axis of the linear area of light reflected from the toric mirror 8 toward the pair of second mirrors 9a and 9b, are in the same plane as the normal line 18 (i.e., are not inclined relative to the normal line 18). In addition, a light-shielding plate 51, in the center of which is formed a slit 51a through which light is emitted, is provided in front of the light-emitting surface of the light source 1. This prevents random reflection of light that might be directed to the front surface of the light source 1 after being reflected from the toric mirror 8, thereby preventing the generation of unevenness in light illumination on the surface of the original document. As with the other embodiments, and as shown in FIG. 6, the optical axes of the emitted and reflected linear areas of light are in the same plane.

With the third embodiment, the same results can be achieved as are realized with the first embodiment.

As explained above, with the light-supplying optical device according to the present invention, because the optical axis of the light emitted by the light source and the optical axis of the linear area of light received by the optical path conversion mirror are in a common plane with a line normal to the toric mirror, which results in the optical axes of the emitted and reflected linear areas of light being in the common plane, when light from the light source is reflected by the toric mirror, it is not necessary for the toric mirror to be inclined at an angle to the optical axis of the light source. The reflected light, i.e., the light between the toric mirror and the optical path conversion mirror, also is not inclined to the toric mirror normal line or to the light source optical axis. As a result, generation of the line bow phenomenon on the surface of the original document can be suppressed, and substantially linear lighting can be performed. Accordingly, substantially uniform lighting can be performed in the region read by the CCD, thereby making it possible to prevent the generation of unevenness in light illumination.

It is understood that mirrors other than a toric mirror could be used to collect light from the light source into a linear area of light. For example, a Fresnel mirror or a cylindrical mirror could be substituted for the toric mirror 8.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A light supplying optical device comprising:
   a light source that emits light along a first path, said first path having an axis;
   a first mirror located in said first path, said first mirror reflecting the light emitted by said light source onto a second path while forming the light emitted from the light source into a linear area of light having a length and a height, said length being greater than said height, said second path having an axis;
   a plane including the axis of said second path and extending in a direction in which the length of the linear area of light extends, said axis of said first path also being contained in said plane; and
   an optical path conversion mirror located on said second path, said optical path conversion mirror reflecting the light travelling along said second path onto a third path, said optical path conversion mirror being a half-mirror that also is positioned in said first path between said light source and said first mirror, light emitted from said light source and travelling along said first path passing through said half-mirror.

2. A light-supplying optical device according to claim 1, wherein a line normal to a central portion of said first mirror also is contained in said plane that contains said axis of said first path.

3. A light-supplying optical device according to claim 1, wherein said first mirror is a toric mirror.

4. A light-supplying optical device comprising:

a light source that emits light along a first path, said first path having an axis;

a first mirror located in said first path and extending linearly in a longitudinal direction, said first mirror reflecting the light emitted by said light source onto a second path while forming the light emitted from the light source onto a linear area of light having a length extending in the longitudinal direction and a height, said second path having an axis;

said axis of said first path and said axis of said second path being contained in a plane that extends in said longitudinal direction; and an optical path conversion mirror located on said second path, said optical path conversion mirror reflecting the light travelling along said second path onto a third path, said optical path conversion mirror being a half-mirror that also is positioned in said first path between said light source and said first mirror, light emitted from said light source and travelling along said first path passing through said half-mirror.

5. A light-supplying optical device according to claim 4, wherein said first mirror is a toric mirror.

6. A light-supplying optical device comprising:

light-emitting means for emitting light along a first path, said first path having an axis;

first reflecting means, located in said first path, for reflecting the light emitted by said light-emitting means onto a second path while forming the light emitted from the light source into a linear area of light, said linear area of light having a length and a height, said length being greater than said height and extending in a longitudinal direction, said second path having an axis;

said axis of said first path and said axis of said second path being contained in a plane that extends in said longitudinal direction of said linear area of light; and second reflecting means, located on said second path, for reflecting the light travelling along said second path onto a third path containing an original document, said second reflecting means being a half-mirror that also is positioned in said first path between said light-emitting means and said first reflecting means, light emitted from said light-emitting means and travelling along said first path passing through said half-mirror.

7. A light-supplying optical device according to claim 6, wherein said first reflecting means is a toric mirror.

8. A light-supplying optical device according to claim 6, wherein a line normal to a central portion of said first reflecting means also is contained in said plane that contains said axes of said first and second paths.

* * * * *